United States Patent Office 3,422,373
Patented Jan. 14, 1969

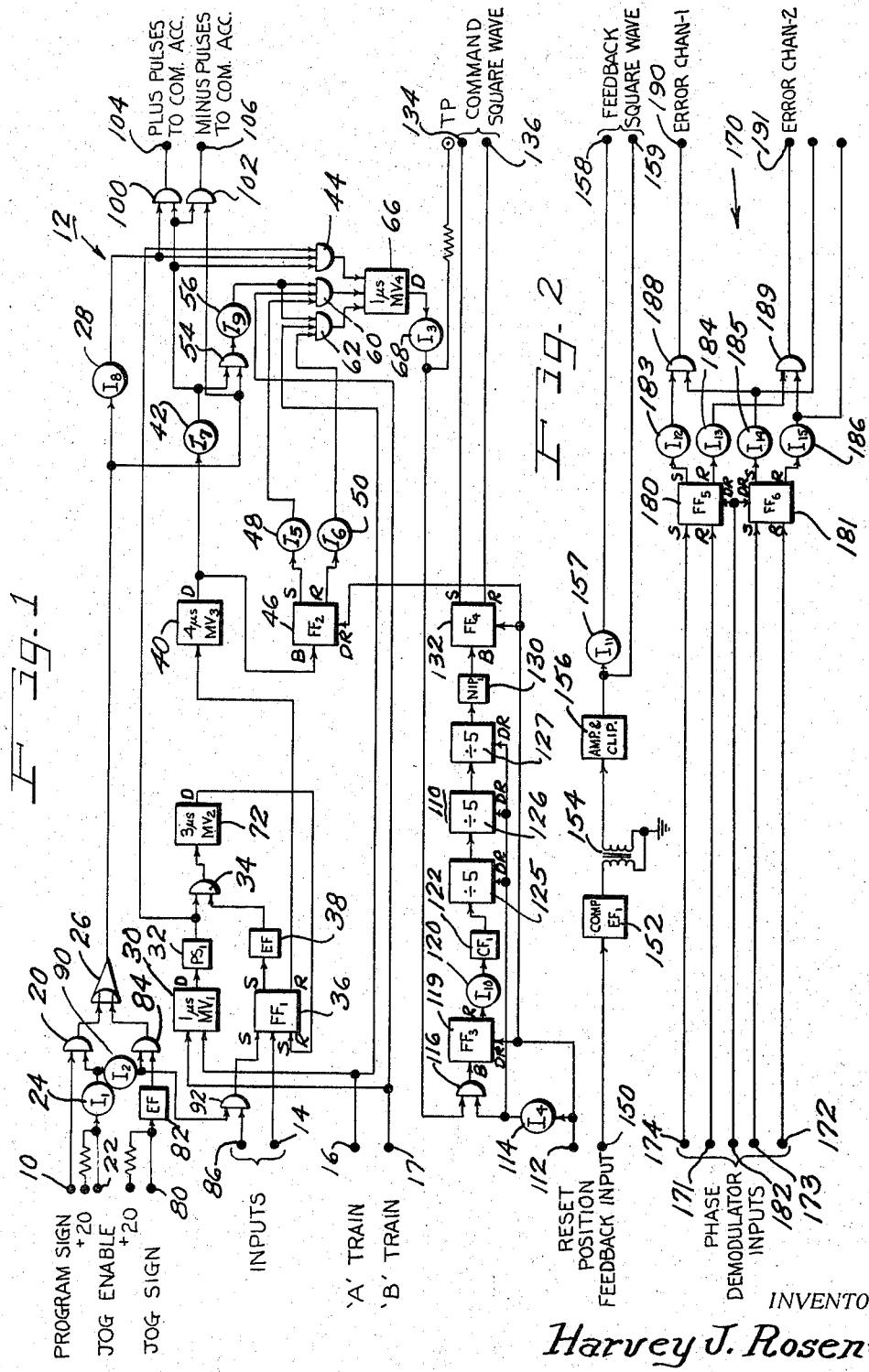

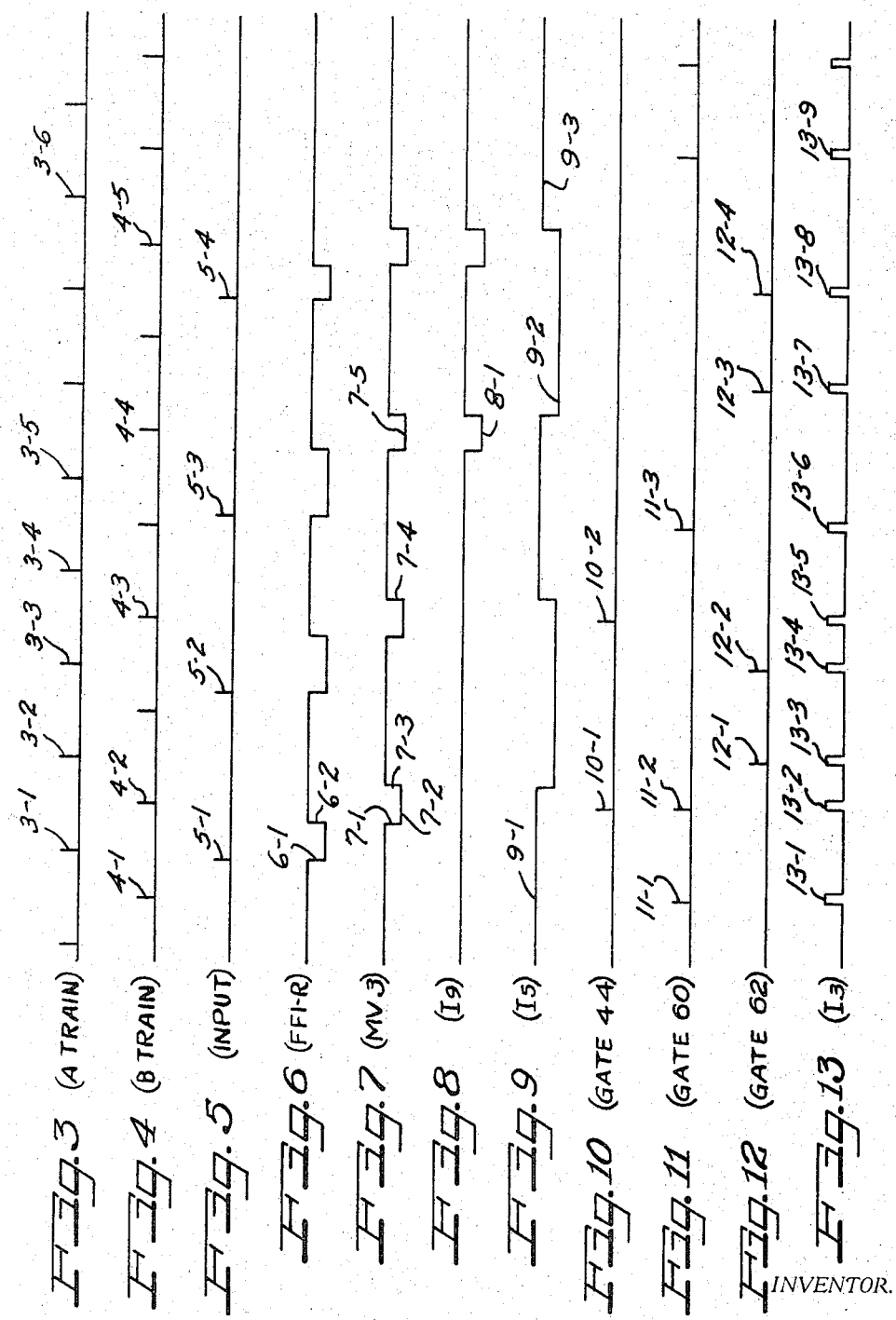

3,422,373
PULSE TRAIN MODULATOR FOR NUMERICAL CONTROL SYSTEMS
Harvey J. Rosener, Dayton, Ohio, assignor, by mesne assignments, to The Bunker-Ramo Corporation, Stamford, Conn., a corporation of Delaware
Filed Nov. 27, 1964, Ser. No. 414,092
U.S. Cl. 332—9    10 Claims
Int. Cl. H03k 7/00; H03k 1/00; H03k 3/04

ABSTRACT OF THE DISCLOSURE

A pulse train modulator for a numerical control system wherein out of phase A and B pulse trains are alternatively available as output pulses, the unmodulated output comprising a succession of A pulses or a succession of B pulses, the successive input pulses causing shifting of the output alternately from A pulses to B pulses, and from B pulses to A pulses, and with each positive input pulse resulting in an output pulse spacing between a pair of successive pulses of one half the unmodulated pulse repetition interval, and with a negative input pulse causing a spacing between a pair of output pulses of one and a half times the unmodulated pulse repetition interval.

---

This invention relates to a modulator system and method and particularly to a command modulator system and method for generating a modulated train of command pulses capable of producing a desired movement of an output element of a machine tool along a given axis, or the like.

In certain numerical contouring systems for controlling machine tools and the like a modulated train of command pulses is generated for actuating a frequency division train, the output from the chain then being a phase modulated alternating waveform. This phase modulated waveform is compared with a feedback alternating waveform to generate an error signal for controlling movement of an output element along a given axis of the machine tool. It is desirable that the command modulator system respond accurately to each input command signal without ambiguity so that the movement of the output element will be precisely the same, for example in the machining of successive parts in accordance with command signals stored on a punched tape or the like.

Accordingly, it is an important object of the present invention to provide a system and method for modulating a pulse train in response to input command pulses or the like without ambiguity.

Another object of the invention is to provide a novel and improved system and method for adding and/or deleting pulses in a pulse train in response to input signals.

A further object of the invention resides in the provision of a numerical contouring system capable of producing pulses having a time spacing of the order of 5 microseconds in response to positive command pulses without requiring a master oscillator of corresponding frequency.

Other objects, features and advantages of the present invention will be apparent from the following detailed description taken in connection with the accompanying drawing, in which:

FIG. 1 comprises a logical diagram illustrating a preferred embodiment of pulse train modulator utilized for generating a phase modulated command square wave for a numerical control system;

FIG. 2 is a logical diagram illustrating a phase demodulator for the phase modulated command square wave generated by the embodiment of FIG. 1;

FIG. 3 illustrates an A pulse train supplied to terminal 16 of FIG. 1;

FIG. 4 illustrates a B pulse train supplied to terminal 17 of FIG. 1;

FIG. 5 illustrates a series of input pulses supplied to input terminal 14, FIG. 1;

FIG. 6 illustrates the corresponding output at the reset output terminal of flip-flop 36(FF1-R);

FIG. 7 illustrates the output from monostable multivibrator 40(MV3);

FIG. 8 illustrates the output from inverter 56(I9);

FIG. 9 illustrates the output from inverter 48(I5);

FIG. 10 illustrates the corresponding output from gate 44, FIG. 1;

FIG. 11 illustrates the output from gate 60, FIG. 1;

FIG. 12 illustrates the output from gate 62, FIG. 1; and

FIG. 13 illustrates the modulated pulse train output from inverter 68(I3), FIG. 1.

MODULATOR SYSTEM

In the illustrated embodiment, the modultaor system is particularly adapted to generate a command pulse train modulated to represent desired increments of movement of a machine tool output element along a given axis in a numerical contouring system. Such a numerical contouring system is illustrated in the McGarrell U.S. Patent 3,079,522 issued Feb. 26, 1963. Said McGarrell patent illustrates a system for generating respective coordinated command pulse signals representing desired movement along respective machine tool axes in accordance with information stored on a punched paper tape or the like. A modulator such as illustrated herein is designed to receive such command input signals relating to a given axis and to generate an output modulated pulse train suitable for actuating a frequency division chain to produce a phase modulated alternating waveform.

When the modulator of the present invention is associated with such a contouring system, the sign of each increment of movement along the axis is obtained from the input medium by means of a tape reader or the like. If the sign of a given increment of movement is positive, a "high" signal will be applied to terminal 10 of the modulator system 12, while if the increment of movement has a negative sign, a "low" signal will be supplied to terminal 10. The increment of movement to be executed is represented by a coded number on the paper tape, and this number is stored and converted to a corresponding number of input command pulses by a system such as illustrated in said U.S. Patent 3,079,522. The series of input command pulses is supplied to terminal 14 of the modulator system 12.

As further illustrated in said McGarrell patent, a 100 kilocycle per second master oscillator generates an A pulse train and a B pulse train with the A pulses occurring alternately with the B pulses and the A pulses having a time spacing of 10 microseconds and the B pulses have a time spacing of 10 microseconds. The A pulse train is supplied to terminal 16 of the modulator 12 while the B pulse train is supplied to terminal 17.

For the case of a positive program sign, gate 20 will have a "high" output. This results from the fact that Jog enable terminal 22 will have a "low" or ground potential applied thereto so that the output of inverter 24 will be "high." Since the output of gate 20 is "high," the output or NOR gate 26 will be "low." On the other hand the output of inverter 28 will be "high."

Prior to receipt of an input command pulse at terminal 14, an A pulse at terminal 16 or a B pulse at terminal 17 will trigger monostable multivibrator 30. The delayed output of monostable multivibrator 30 is supplied to a pulse shaper circuit 32 to generate an output pulse in response to the falling edge produced by the monostable multivibrator 30. The output pulse from circuit 32 is not transmitted by AND gate 34 because at this time flip-flop 36 is in a reset condition and the set output thereof to emitter follower 38 is in a "low" state. Similarly monostable multivibrator 40 is in its stable condition so that the delayed output thereof is in a "high" condition. The output of inverter 42 is therefore in a "low" condition disabling gate 44 which also receives the output pulses from the pulse shaping circuit 32.

It may be assumed that the flip-flop 46 is in its reset condition so that the set output thereof is "low" and the reset output thereof is "high." The output of inverter 48 is therefore "high" while the output of inverter 50 is "low." Since the output of the NOR gate 26 is "low" AND gate 54 is disabled and its output is "low." Accordingly the output of inverter 56 is "high" partially enabling gates 60 and 62. Since gate 60 is also partially enabled by the output of inverter 48 (which is "high" as indicated at 9–1 in FIG. 9), the B pulses such as 4–1, FIG. 4 supplied thereto from terminal 17 will be transmitted by gate 60 as indicated at 11–1, FIG. 11 and actuate the monostable multivibrator 66 to provide an output from inverter 68 (I3) as indicated at 13–1 in FIG. 13. (The various portions of the waveforms in FIGS. 3–13 will be designated by reference numerals wherein the initial digit or digits preceding the hyphen will correspond to the figure number.) Thus, a series of negative pulses of one microsecond duration will appear at the output of monostable multivibrator 66, the pulses having a spacing of 10 microseconds where the B pulses have a spacing of 10 microseconds. This unmodulated pulse train may be inverted inverter 68 to supply a positive series of pulses such as indicated at 13–1 and 13–2 which can be fed to a frequency divider chain to generate a command square wave as described in said McGarrell patent.

If the flip-flop 46 had been in set condition, the output of inverter 50 would be "high," and the A pulse train from terminal 16 would have been transmitted to the monostable multivibrator 66.

It will be appreciated that the flip-flop 46 thus controls which of the A pulse train and the B pulse train is transmitted to the monostable multivibrator 66.

Still considering the case of a positive program sign at terminal 10, let it be assumed that an input command pulse 5–1 is received at terminal 14 which is connected to a set input terminal of flip-flop 36. The input command pulse sets flip-flop 36, the reset output of flip-flop 36 going "low" and the set output of the flip-flop going "high," thereby enabling gate 34. The next A and B pulse such as 3–1 is thus transmitted by gate 34 to a monostable multivibrator 72, and the delayed output of this monostable multivibrator serves to reset flip-flop 36. Upon resetting of flip-flop 36, the reset output thereof goes "high" as indicated at 6–2, triggering monostable multivibrator 40. The output of the monostable multivibrator 40 thus goes "low" as shown at 7–1 after a total time delay of about 4 microseconds relative to the occurrence of the A or B pulse (pulse 3–1) triggering monostable multivibrator 30. The output of monostable multivibrator 40 remains "low" for a time interval of 4 microseconds as indicated at 7–2 in the illustrated embodiment so as to extend over the time interval of the next succeeding A or B pulse (pulse 4–2). That is, if an A pulse (pulse 3–1) arrives at gate 34 first after the gate is enabled by the input command pulse, then the output of monostable multivibrator 40 will be "low" at the time of occurrence of the next B pulse (pulse 4–2). Conversely, if a B pulse had been transmitted by gate 34, the "low" output of monostable multivibrator 40 would occur at the time of the next succeeding A pulse supplied to terminal 16. The "low" output of monostable multivibrator 40 is converted to a "high" output from inverter 42, but is not transmitted by gate 54 since the output of NOR 26 is "low." (A B pulse supplied to gate 60 would be deleted as will hereinafter be described if the program sign were minus.)

The high output of inverter 42 partially enables gate 44 so that this gate transmits the A or B pulse occurring during the interval when the monostable multivibrator 40 has a "low" output as indicated by the presence of pulse 10–1.

Assuming, for example, that an A pulse is transmitted by gate 34 in response to the input command pulse (pulse 3–1), then the B pulse following 5 microseconds behind such A pulse (pulse 4–2), will be transmitted by gate 44 (as indicated at 10–1) to monostable multivibrator 66. If the A pulse transmitted by gate 34 is thought of as occurring at time 0 at terminal 16, then the next B pulse (pulse 3–2) will occur at time 5 microseconds. This B pulse at time 5 microseconds will be transmitted by gate 60 (as indicated at 11–2) without substantial delay and will thus represent a normal unmodulated pulse output from monostable multivibrator 66. However, the B pulse occurring at time 5 microseconds is transmitted by monostable multivibrator 30 through pulse shaper 32, so that a B pulse at time 5 microseconds is transmitted by gate 44 (as indicated at 10–1) to monostable multivibrator 66.

After the time delay introduced by monostable multivibrator 40, the delayed output thereof returns to a "high" value (as indicated at 7–3) triggering flip-flop 46, for example from a reset to a set condition. This results in the disabling of gate 60 and in the enabling of gate 62 at a time 8 microseconds after the occurrence of the A pulse (pulse 3–1) at terminal 16, so that the next succeeding A pulse (pulse 3–2) occurring at time 10 microseconds will be transmitted by gate 62 as shown at 12–1, the resulting output pulse being indicated at 13–3. Thus, the supply of an input command pulse to terminal 14 has resulted in the transmission of an additional pulse by gate 44 and has also resulted in a shift from the transmission of B pulses by gate 60 to the transmission of A pulses by gate 62. The B pulse (pulse 11–2) transmitted by gate 60 at time 5 microseconds triggers monostable multivibrator 66, so that the further pulse transmitted by gate 44 at time 5 microseconds will not have an effect on the output of inverter 68. However, monostable multivibrator 66 will deliver a 1 microsecond output pulse beginning at time 5 microseconds (as indicated at 13–2) and will deliver a further output pulse beginning at time 10 microseconds (as indicated at 13–3), so that the input command pulse has had the effect of providing a time spacing between two successive output pulses (13–2 and 13–3) of about 5 microseconds, after which the normal unmodulated train of pulses having a time spacing of 10 microseconds will be supplied from the modulator in the absence of further command pulses.

In the event that flip-flop 46 were set at the time of receipt of the input command pulse (as is the case for input pulse 5–2), and where an A pulse (such as 3—3) occurring at time zero is transmitted by gate 34 at time one microsecond, an A pulse will be transmitted by gate 62 at time zero, (pulse 12–2, for example), but the A pulse (pulse 3–4) occurring at time ten microseconds will be blocked at gate 62, because at time 8 microseconds, flip-flop 46 will have been reset by the delayed output of monostable multivibrator 40 (indicated 7–4). In this event, the B pulse occurring at time 5 microseconds at the output of component 32 (corresponding to pulse 4–3 of the train at terminal 17) will be the pulse to trigger monostable multivibrator 66. Thus, with flip-flop 46 initially set, the A pulse (pulse 3—3) at time zero produces a negative pulse from monostable multivibrator 66 at time zero (and a corresponding positive pulse 13–4 at the output of inverter 68), the delayed B pulse (shown at 10–2) transmitted by gate 44 produces a negative output pulse from monostable multivibrator 66 beginning at time 5 microseconds (and a corresponding positive pulse 13–5), and thereafter gate 60 will supply B pulses at times 15 microseconds (pulse 11–3) and at 10 microsecond intervals thereafter in the absence of further input command pulses.

The operation of the modulator in the event that a B pulse is transmitted by gate 34 in response to an input command pulse will be apparent from the preceding discussion.

For the case where the program sign is "low" so that gate 20 is disabled, the two inputs to NOR gate 26 will be "low," so that the output therefrom will be "high."

If now an input command pulse is received at terminal 14 (as at 5–3), and an A pulse (as at 3–5) is transmitted by gate 34 at time one microsecond, monostable multivibrator 40 will have a "low" output between times four and eight microseconds as indicated at 7–5 to provide a "high" output from inverter 42 which is transmitted by gate 54 (gate 54 being enabled by the output of NOR 26). The positive pulse from AND gate 54 between times 4 microseconds and 8 microseconds is inverter 56 to provide pulse 8–1 at its output and thus to block gates 60 and 62 in the time interval from four microseconds to eight microseconds. Thus, if flip-flop 46 were reset, the B pulse (pulse 4—4) at terminal 17 occurring at time five microseconds would be blocked by the output of inverter 56. Further, at time 8 microseconds, the monostable multivibrator 40 would trigger flip-flop 46 to its set condition (as indicated by the output of inverter 48 at 9–2), enabling gate 62 so as to transmit the A pulse occurring at time 10 microseconds (as indicated at 12–3). Since it is assumed that flip-flop 46 was initially reset, the spacing produced would be between a B pulse at 13–6 occurring at time minus 5 microseconds and the A pulse 13–7 occurring at time ten microseconds. Accordingly, a minus input command pulse produces a time spacing between successive command output pulses (13–6 and 13–7) of 15 microseconds.

If with the same conditions just mentioned flip-flop 46 had been initially set (as is shown for input pulses 15–4), gate 62 would have transmitted an A pulse (such as 12–4) at zero microseconds, flip-flop 46 would have been reset (as indicated by the inverter waveform at 9–3) at time 8 microseconds so as to block the A pulse (pulse 3–6) at ten microseconds, and the B pulse (pulse 4–5) at 5 microseconds would have been blocked at gate 60 because flip-flop 46 was in set condition at time 5 microseconds. Thus, in this case, with flip-flop 46 initially set, the output from the gates would comprise an A pulse (corresponding to output pulse 13–8) (corresponding to output pulse 13–9) at time zero and then a B pulse at time 15 microseconds, again providing a 15 microsecond spacing between successive output pulses.

The operation of the circuit with a minus program sign and a B pulse transmitted by gate 34 in response to an input command pulse, will be apparent from the foregoing discussion.

For Jog operation, the sign is determined by the input to terminal 80. If a plus sign is desired, terminal 80 is left ungrounded, so that there is a "high" potential input to emitter follower component 82 and to gate 84. On the other hand if a minus sign is desired, terminal 80 is grounded, for example, to provide a "low" input to gate 84 disabling the gate. During Jog operation, the command pulse source is disabled, and a Jog pulse source connected to terminal 86 is enabled to supply a steady stream of Jog command pulses to terminal 86 at a desired frequency. By way of example, the Jog pulses may be supplied by a variable frequency oscillator having a frequency adjustable between two kilocycles per second and 33 kilocycles per second. To initiate Jog operation, ground potential is removed from Jog enable terminal 22 so as to provide a "high" input to inverter 24 and a "low" output from the inverter which disables gate 20. The "low" input to inverter 90 enables gate 84 which then transmits the Jog sign information from terminal 80, in the same way that gate 20 transmitted the program sign information. Thus when the Jog sign is positive, the output of gate 84 will be "high" and the output of NOR 26 will be "low," while when the Jog sign is minus, gate 84 will have a "low" output as will gate 20, providing a "high" output from NOR 26.

The Jog pulses supplied to input terminal 86 are transmitted by gate 92 which is enabled by the "high" output from inverter 90 (Jog enable terminal 22 being "high"). Thus, each Jog input pulse will serve to set flip-flop 36 and produce the same operation as described in conjunction with program or automatic operation.

COMMAND ACCUMULATOR

The illustrated circuit also includes a pair of gates 100 and 102 having outputs connected to terminals 104 and 106. Since the output of inverter 28 is "high" for positive operation, it will be seen that gate 100 is enabled for a positive program sign or Jog sign. Similarly, since the output of NOR 26 is "high" for a negative sign, it will be apparent that gate 102 will be enabled for a negative program sign or a negative Jog sign. Further, it will be apparent that the positive output pulses from inverter 42 which occur in response to each command input pulse are transmitted to both gates 100 and 102, so that terminals 104 and 106 will receive each positive command pulse and each negative command pulse, respectively. These output terminals 104 and 106 may be connected to a command pulse accumulator which counts in one direction in response to positive input pulses and counts in the opposite direction in response to minus input pulses. With this arrangement, with program operation where the program returns the output element of the system to its initial position at the end of a machining operation or the like, the command accumulator 40 for the axis of movement represented in the drawing should return its count to zero in the absence of an error. In a system in accordance with the present invention, a return to zero indicator lamp is actually associated with the command accumulator so as to indicate that the output element of the system has actually returned to its initial position without error.

COMMAND FREQUENCY DIVIDER

From the preceding description, it will be understood that the output of the inverter 68 is a series of command pulses the number of which per unit times being a function of the distance and direction of movement to be executed by an output element of the system. This modulated command pulse train is converted to a command square wave by means of a frequency divider chain indicated generally by the reference numeral 110. In operation of the frequency divider chain, reset terminal 112 is "low" so that the output of inverter 114 is "high" enabling gate 116. Thus the command pulses from inverter 68 are transmitted by gate 116 to the binary input of flip-flop 119 which at the beginning of a cycle is in reset condition. Each two command pulses serve to produce a reset output from the flip-flop which output is transmitted by means of inverter 120 and a suitable inverting type amplifier component 122 (labeled CF1 in FIG. 1) to the input of a series of cascaded divide-by-five stages 125, 126 and 127. The stages 125–127 are preferably not of a binary counter type, but are preferably of the energy-storage counter type. Preferably the divider stages 125–127 are of the type wherein successive positive-going input pulses transfer successive equal increments of charge to a storage capacitor, the output circuitry of the stage being triggered after five increments of charge have accumulated at the storage capacitor. Where a transistor senses the accumulated voltage of the storage capacitor and becomes conductive after a count of five to discharge the capacitor, the output from the transistor may be a negative pulse which is then differentiated and clipped to transmit a positive actuating pulse to the next stage of the frequency divider. Where the third stage 127 simply transmits the negative pulse without differentiation and clipping, a negative input pulser component 130 may be utilized to transmit a positive pulse in response to the negative-going output pulse from stage 127. Each positive-going pulse from pulser 130 actuates the binary input of a flip-flop 132 so that the flip-flop delivers respective out of phase command square waves to terminals 134 and 136.

Where the storage capacitors (not shown) of divider stages 125–127 accumulate positive charge, the positive reset pulse at terminal 112 should be inverted as indicated by component 114 so as to insure discharge of the storage capacitors during a resetting operation.

FEEDBACK CIRCUIT

As illustrated in said McGarrel Patent No. 3,079,522, the master 100 kilocycle per second oscillator also supplies a reference frequency divider which specifically receives the A pulse train and divides the same by 500 to provide a 200 cycle per second reference square wave. This reference square wave actuates a sine wave generator to produce a sine wave output of 200 cycles per second. This sine wave output may then supply a manual phase shift resolver and a feedback resolver, the feedback resolver being coupled with the output element for the machine axis with which it is associated. Thus, the output of the feedback resolver is a 200 cycle per second sine wave whose phase relative to the reference frequency is a function of the instantaneous load position. This feedback sine wave may be supplied to position feedback input terminal 150 to drive a complementary emitter follower 152. The output of the component 152 is stepped up approximately 1:2 by transformer 154 and supplied to an amplifier and clipper component 156 whose output will then be a square wave of 200 cycles per second. This output is supplied through an inverter component 157 to terminal 158 and is supplied directly to terminal 159.

PHASE DEMODULATOR

The outputs of the command square wave terminals 134 and 136 and the feed back square wave terminals 158 and 159 are supplied to a phase demodulator arrangement generally designated by the reference numeral 170. More specifically, terminals 134, 136, 158 and 159 may be connected to phase demodulator input terminals 171–174, respectively. Terminal 171 is connected to the reset input of flip-flop 180, terminal 172 is connected to the reset input of flip-flop 181, terminal 173 is connected to the set input of flip-flop 181, and terminal 174 is connected to the set input of flip-flop 180. Terminal 182 is connected to direct coupled reset inputs of flip-flops 180 and 181 for resetting the flip-flops at the beginning of a cycle of operation.

The set output of flip-flop 180 is connected to an inverter 183, the reset output of flip-flop 180 is connected to an inverter 184, the set output of flip-flop 181 is connected to an inverter 185 and reset output of flip-flop 181 is connected to an inverter 186. The outputs of inverters 183 and 185 are connected to inputs of an AND gate 188, and the outputs of inverters 184 and 186 are connected to respective inputs of an AND gate 189. With this arrangement, a series of positive pulses will appear at output terminal 190 when the command square wave at terminal 136 leads the feedback square wave at terminal 159. The width of the output pulses will be proportional to the phase error. When the feed back square wave at terminal 159 leads the command square wave terminal 136, the output will be a series of pulses at terminal 191 with a zero output at terminal 190. Again, the width of the pulses is a function of the phase error. If the output from terminal 191 is inverted, it will be apparent that the output signals will then conform to those of the McGarrell U.S. Patent 3,079,522, so that the remainder of the servo circuitry of the McGarrell patent may be utilized for driving the output element of the axis in a direction so as to tend to bring the feedback square wave into phase with the command square wave.

NOTATION

In the illustrated logic diagram which assumes "positive logic" the "AND" gates have been consistently illustrated as indicated at 34. The symbol "D" associated with monostable multivibrators 30, 40, 66 and 72 indicates that the output is initially negative going in response to a positive input pulse, the output then becoming positive going after the time delays indicated. The symbol "S" at the input to a flip-flop indicates that the flip-flop will be actuated to set condition by a positive going pulse at the input, but cannot be actuated to a reset condition by a posiive going pulse at the input. Similarly, the symbol "R" at the input of a flip-flop indicates that the flip-flop can be reset only by a positive going input pulse. The symbol "S" at the output of a flip-flop indicates that the output terminal will go "high" when the flip-flop is set. Similarly, the symbol "R" at the output of a flip-flop indicates that the output terminal will go "high" when the flip-flop is reset. The symbol "B" at the input to a flip-flop indicates that a positive going pulse supplied to the input will either set or reset the flip-flop, so that a series of positive input pulses to a binary input will alternately set and reset the flip-flop. The symbol "DR" associated with the flip-flops indicates that a "high" potential will serve to maintain the flip-flop in a reset condition. The symbol "DR" associated with the divider stages 125–127 indicates that a direct coupled potential will serve to maintain the stages in their initial condition. As previously explained, where the dividers operate on the principle of supplying successive increments of positive charge to storage capacitors, the divider stages will be maintained in the initial condition by a "low" signal at the output of inverter 114.

MODIFICATIONS

It will be understood that the illustrated logical diagram is based on so-called "positive logic" wherein the various components except as indicated are actuated by positive-going pulses. The same functions could be performed utilizing so-called "negative logic."

While monostable multivibrators 30 and 66 have been utilized for convenience in providing suitable output pulses for the system, it will be understood that other suitable circuitry may be substituted therefor, and that the time delays introduced by these components may both be omitted or may have a different value such as two micro seconds. In the illustrated embodiment, however, where a time delay is introduced between an A pulse transmitted by gate 62 and the corresponding A pulse transmitted by gate 44, the output circuitry such as represented by component 66 should be such that only one of such pulses actuates the command frequency divider 110. Many arrangements for accomplishing this are, of course, possible.

It will be apparent that many modifications and variations may be effected without departing from the scope of the novel concepts of the present invention.

I claim as my invention:

1. The method of generating a modulated pulse train comprising generating first and second series of pulses with the first pulses of the first series occurring alternately with the second pulses of the second series, and transmitting the first pulses of the first pulse train to an output in the absence of a modulating signal to provide an unmodulated output pulse train with a predetermined pulse repetition interval, wherein the improvement comprises:

responding to successive modulating signals to alternately change, from transmission of the first pulses to transmission of the second pulses, and from transmission of the second pulses to transmission of the first pulses, and transmitting from the output between successive modulating signals alternately an unmodulated output pulse train consisting of a series of said first pulses and an unmodulated output pulse train consisting of a series of said second pulses.

2. A method of generating a modulated pulse train in accordance with claim 1 wherein successive modulating signals result in respective pairs of output pulses having a time interval therebetween of approximately one-half said pulse repetition interval.

3. A method of generating a modulated pulse train in accordance with claim 1 wherein the response to successive modulating signals results in a spacing of respective pairs of output pulses approximately equal to one and a half times said predetermined pulse repetition interval.

4. The method of generating a modulated train of pulses which comprises:

generating a series of first pulses having a predetermined time interval therebetween, generating a series of second pulses occurring alternately with said first pulses, transmitting one of said series of pulses to an output in the absence of a modulating signal, and switching from the transmission of the one series of pulses to the transmission of the other series of pulses with the last of the one series of pulses having a reduced time spacing from the first of the other series of pulses transmitted to said output in comparison to said predetermined time interval in response to a modulating signal of one polarity, and switching from the transmission of the one series of pulses to the transmission of the other series of pulses and blocking a pulse to provide a relatively increased time spacing between the last of said one series of pulses and the first of said other series of pulses in comparison with said predetermined time interval in response to a modulating signal of opposite polarity.

5. A modulator system comprising:

means for generating first and second pulse trains comprising first pulses and second pulses, respectively, with the first and second pulses occurring alternately in time, output means, means for transmitting one of said pulse trains to said output means in the absence of a modulating signal, and means responsive to a modulating signal to discontinue transmission of said one of said pulse trains to said output means and to initiate transmission of the other of said pulse trains to said output means, and for maintaining alternately the transmission to said output means of the one of said pulse trains and the transmission to the output means of the other of said pulse trains, between successive modulating signals.

6. A modulator system comprising:

means for generating first and second pulse trains comprising first pulses and second pulses, respectively, with the first and second pulses occuring alternately in time, output means, means for transmitting one of said pulse trains to said output means in the absence of a modulating signal, and means responsive to a modulating signal for supplying a pulse to said output means after the last pulse of said one of said pulse trains within a time interval equal to about one-half the time interval between the pulses of either one of said pulse trains, and for thereafter supplying said other of said pulse trains to said output means until a further modulating signal is received.

7. A modulator system comprising:

means for generating first and second pulse trains comprising first pulses and second pulses, respectively, with the first and second pulses occurring alternately in time, output means, means for transmitting one of said pulse trains to said output means in the absence of a modulating signal, and means responsive to a modulating signal to discontinue transmission of said one of said pulse trains to said output means and to initiate transmission of the other of said pulse trains to said output means, and for providing a time interval between the last of the pulses of said one of said pulse trains and the first of the pulses of the other of said pulse trains equal to about one and one-half times the time interval between the pulses of either one of said pulse trains, and for maintaining alternately the transmission to said output means of said one of said pulse trains and the transmission to said output means of said other of said pulse trains, between successive modulating signals.

8. A modulator system comprising:

means for generating first and second pulse trains comprising first pulses and second pulses, respectively, with the first and second pulses occurring alternately in time, output means, means for transmitting one of said pulse trains to said output means in the absence of a modulating signal, means responsive to a positive modulating signal for supplying a pulse to said output means after the last pulse of said one of said pulse trains within a time interval equal to about one-half the time interval between the pulses of either one of said pulse trains, and means responsive to a negative modulating signal to discontinue transmission of said one of said pulse trains to said output means and to initiate transmission of the other of said pulse trains to said output means, and for providing a time interval between the last of the pulses of said one of said pulse trains and the first of the pulses of the other of said pulse trains equal to about one and one-half times the time interval between the pulses of either one of said pulse trains.

9. A modulator system comprising:

first, second and third gating means each having respective inputs and an output, output means coupled to the outputs of the respective gating means, means for generating first and second pulse trains comprising first pulses and second pulses, respectively, with the first and second pulses occurring alternately in time, and for generating a third pulse train comprising a combination of the first and second pulse trains and comprising third pulses with a time spacing therebetween approximately equal to one-half the time spacing between either one of said first and second pulse trains, means for supplying the first pulse train to an input of the first gating means, for supplying the second pulse train to an input of the second gating means, and for supplying the third pulse train to an input of the third gating means, means for maintaining one of said first and second gating means enabled and for maintaining the other of said first and second gating means disabled and for maintaining said third gating means disabled in the absence of a modulating signal, means coupled with a further input of each of said first and second gating means and responsive to a positive modulating signal to enable the other of said first and second gating means and to disable said one of said first and second gating means, and means coupled to a further input of said third gating means and responsive to a positive modulating signal to enable said third gating means so as to provide a third pulse to said output means from the output of said third gating means after the last pulse to said output means from the output of said one of said first and second gating means.

10. A modulator system comprising:

first and second gating means each having respective inputs and an output, output means coupled to the outputs of said first and second gating means, means for generating first and second pulse trains comprising first pulses and second pulses, respectively, with the first and second pulses occurring alternately in time, means for supplying the first pulse train to an input of the first gating means, and for supplying the second pulse train to an input of the second gating means, means for maintaining one of said first and second gating means enabled and for maintaining the other of said first and second gating means disabled in the absence of a modulating signal, and means coupled with a further input of each of said first and second gating means and responsive to a negative modulating signal to enable the other of said first and second gating means and to disable said one of said first and second gating means and for providing a time spacing between the last pulse to said output means from the output of the one of said gating means and the first pulse to said output means from the output of said other of said gating means which is substantially greater than the time interval between successive pulses of either one of said first and second pulse trains.

References Cited

UNITED STATES PATENTS

| | | | |
|---|---|---|---|
| 3,079,522 | 2/1963 | McGarrell | 318—20.37 X |
| 3,251,051 | 5/1966 | Harries et al. | 328—61 X |
| 3,320,501 | 5/1967 | Davies | 318—20.37 X |

ALFRED L. BRODY, *Primary Examiner.*

U.S. Cl. X.R.

318—18, 162; 328—61; 340—345; 346—74